Figure 1:
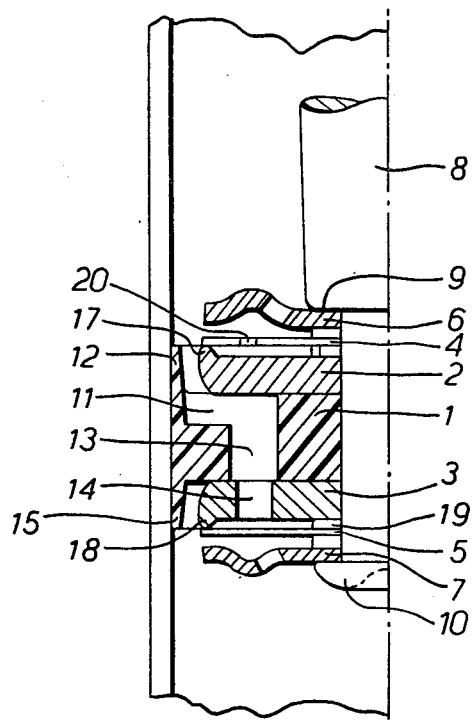

United States Patent [19]

Nicholls

[11] 4,121,704
[45] Oct. 24, 1978

[54] VALVE ASSEMBLY FOR A PISTON OF A TELESCOPIC DAMPER

[75] Inventor: Lawrence George Nicholls, Birmingham, England

[73] Assignee: Girling Limited, Birmingham, England

[21] Appl. No.: 779,483

[22] Filed: Mar. 21, 1977

[51] Int. Cl.² .......................................... F16F 9/348
[52] U.S. Cl. .................................. 188/282; 137/493.8; 188/322
[58] Field of Search .................. 188/282, 317, 322; 137/493, 493.8

[56] References Cited

U.S. PATENT DOCUMENTS

| 2,159,289 | 5/1939 | Nickelsen | 137/493.8 |
| 2,655,233 | 10/1953 | Funkhouser et al. | 137/493.8 |

FOREIGN PATENT DOCUMENTS

| 235,909 | 10/1960 | Australia | 188/322 |
| 76,115 | 8/1961 | France | 137/493 |
| 647,296 | 12/1950 | United Kingdom | 188/322 |

Primary Examiner—Edward R. Kazenske
Attorney, Agent, or Firm—Scrivener, Parker, Scrivener & Clarke

[57] ABSTRACT

In a valve assembly for a telescopic damper, comprising a piston with flow channels controlled by valve members located on opposite sides of the piston, axially directed, annular valve seats which cooperate with the valve members are provided on separately formed seat members positioned against the side faces of the piston and having apertures aligned with the piston channels.

5 Claims, 2 Drawing Figures

VALVE ASSEMBLY FOR A PISTON OF A TELESCOPIC DAMPER

Damper valves for telescopic dampers as used in road vehicles must be designed to cater for the requirements of the particular vehicles in which they are to be employed, and these requirements vary considerably as between different vehicles. Accordingly, damper manufacturers must have a wide range of dampers for different duties.

The present invention aims at the provision of a damper valve assembly composed of separately manufactured components, each of which can be produced in a number of versions differing as to their flow controlling characteristics and interchangeable with each other to permit the assembly of a wide range of damper valves from a relatively small range of standardised components.

In accordance with the invention there is provided a valve assembly for a telescopic damper, comprising a piston member having first and second flow channels with inlet and outlet ends respectively at one side of the piston and outlet and inlet ends respectively at the other side of the piston, and a pair of valve seat members located on opposite sides of the piston member and having flow apertures therethrough, each valve seat member presenting an annular seat directed axially and cooperating with a respective flexibly resilient annular valve member secured at its inner periphery with respect to the seat number and bearing adjacent its outer periphery against the annular seat, the seat and valve members being arranged to permit flow through the first and second channels in opposite respective directions through the piston member.

In a preferred embodiment of the invention the through flow channels in the piston member have their inlet ends permanently open, the valve seat members are disposed against the respective side faces of the piston member with their flow apertures aligned with the outlet ends of the respective flow channels, and the annular valve seats are directed axially away from the piston member.

Figure 2:
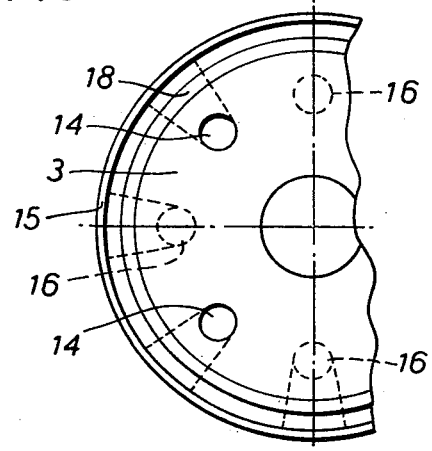

The above mentioned preferred embodiment is described in detail below, by way of example, with reference to the accompanying drawing FIG. 1 is an axial half section of the valve assembly; and FIG. 2 is an end view with some components omitted for clarity.

The damper valve assembly shown in the drawing comprises a piston 1, upper and lower valve seat members 2, 3 upper and lower valve members 4, 5 and upper and lower limit stop members 6, 7 all mounted on a piston rod 8 and clamped up against a piston rod shoulder 9 by the end of the rod being riveted over at 10.

The piston has a first set of flow passages 11 to permit flow downwardly through the piston, each passage being open at the upper side of the piston to an annular gap formed between a piston lip 12 and the upper seat member 2, and terminates in an axial hole 13 open at the lower face of the piston, where it registers with a hole 14 through the seat member 3.

Similarly a second group of flow passages extend through the piston in the opposite direction from a gap adjacent a lower piston lip 15 and terminate in axial holes 16 which register with holes through the upper seat member 2.

The holes through the seat members are formed in recessed central portions of those members radially inside respective raised annular seats 17 and 18. The valve members 4 and 5 which cooperate with the seats 17, 18 are in the form of resiliently flexible annular discs which are firmly clamped at their inner peripheries to the respective seat members. The discs are held in a slightly dished condition so as to have a resilient pre-stress against the valve seats. The degree of pre-stress is determined by difference between the axial thickness of the spacers 19 and the axial height of the valve seats 17 and 18.

In operation downward movement of the piston causes liquid to flow upwardly through the piston and through the holes in the seat member 2, causing the valve member 4 to flex and lift off seat 17. Small flows can be accommodated by orifices 20 in the valve member 4.

Upward piston movement causes flow in the reverse direction, lifting the valve member 5 off its seat 18.

The above described components of the valve are each subject to design variations which will modify the operating characteristics of the valve.

For example, the piston may have more or less flow channels. The seat members 2 and 3 may have more or less holes and/or holes of different diameters to alter the effective through flow area in each direction of flow. The spacers 19 may be of different thickness to increase or reduce the pre-stress of the valve members 4, 5, which themselves may have different stiffnesses (spring rates). It is possible for each of the valve members to consist of a single element or a number of elements stacked together, in which case the spring rate of the valve member can be altered by varying the number of elements. It may thus be seen that a large variety of operating characteristics can be achieved by interchange of individual components of the valve.

The piston may be a sintered component or a plastics moulding. In the latter case, it provides good bearing properties and also good sealing properties by virtue of the cup-washer action of the piston lips 12 and 15.

The valve seat members 2, 3 may conveniently be formed as sintered components or as metal pressings.

What is claimed is:

1. A valve assembly for a telescopic damper, comprising a piston member, first and second flow channels extending through said piston member between opposite axial sides of said piston member, said first and second flow channels having inlet and outlet ends respective at one side of said piston member and outlet and inlet ends respectively at the other side of said piston member, a pair of separate valve seat members located one on each side of said piston member in face-to-face abutment with a respective opposite side of said piston, said seat members having flow apertures therethrough and each valve seat member presenting an annular seat axially directed away from said piston, and a pair of flexibly resilient annular valve members, each valve member having an inner periphery secured with respect to a respective seat member and a portion adjacent the outer periphery thereof bearing against said annular seat of the associated seat member, said seat and valve members permitting flow through said first and second channels in opposite respective directions through said piston member.

2. A valve assembly according to claim 1, wherein the inlet end of said first and second flow channels extending through said piston are permanently open, said flow apertures in said valve seat members being aligned with the outlet ends of the respective flow channels.

3. A valve assembly according to claim 1, wherein a stop element is associated with each valve member for limiting movement of the valve member away from the valve seat.

4. A valve assembly according to claim 1, wherein one or more orifices are provided in at least one of said valve members to permit small fluid flows through the assembly.

5. A telescopic damper according to claim 1, wherein the inner periphery of each valve member is separated from the associated seat member by a spacer of preselected thickness to provide a predetermined pre-stress of the valve member against the valve seat.

* * * * *